United States Patent
Wang et al.

(10) Patent No.: US 11,716,130 B2
(45) Date of Patent: Aug. 1, 2023

(54) METHODS AND SYSTEMS FOR DYNAMIC INTERFERENCE MITIGATION

(71) Applicant: Verizon Patent and Licensing Inc., Basking Ridge, NJ (US)

(72) Inventors: Xin Wang, Morris Plains, NJ (US); Susan Wu Sanders, Bridgewater, NJ (US); Nischal Patel, Hillsborough, NJ (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 52 days.

(21) Appl. No.: 17/224,364

(22) Filed: Apr. 7, 2021

(65) Prior Publication Data
US 2022/0329300 A1    Oct. 13, 2022

(51) Int. Cl.
| | |
|---|---|
| H04B 7/06 | (2006.01) |
| H04W 24/10 | (2009.01) |
| H04L 5/00 | (2006.01) |
| H04B 17/318 | (2015.01) |
| H04B 17/336 | (2015.01) |

(52) U.S. Cl.
CPC ......... *H04B 7/0626* (2013.01); *H04B 17/318* (2015.01); *H04B 17/336* (2015.01); *H04L 5/0051* (2013.01); *H04W 24/10* (2013.01)

(58) Field of Classification Search
CPC .. H04B 7/0626; H04B 17/318; H04B 17/336; H04L 5/0051; H04W 24/10
See application file for complete search history.

(56) References Cited

U.S. PATENT DOCUMENTS

| | | | |
|---|---|---|---|
| 9,490,855 B1* | 11/2016 | Rimini | H04L 43/16 |
| 2004/0259502 A1* | 12/2004 | Weidner | H04B 1/109 455/63.1 |
| 2014/0016498 A1* | 1/2014 | Sharma | H04L 5/0032 370/252 |
| 2014/0094164 A1* | 4/2014 | Hwang | H04W 16/28 455/423 |
| 2015/0319768 A1* | 11/2015 | Abdelmonem | H04L 5/0021 455/501 |
| 2017/0041880 A1* | 2/2017 | Ouchi | H04W 52/34 |
| 2017/0245284 A1* | 8/2017 | Hassan | H04B 15/02 |
| 2017/0303156 A1* | 10/2017 | Kimura | H04J 11/0036 |
| 2018/0337756 A1* | 11/2018 | Nam | H04W 72/541 |
| 2019/0191317 A1* | 6/2019 | Safavi | H04W 24/02 |
| 2020/0036490 A1* | 1/2020 | Qian | H04L 5/0073 |
| 2021/0266778 A1* | 8/2021 | Cao | H04W 72/082 |
| 2022/0053512 A1* | 2/2022 | Rassam | H04W 24/02 |

FOREIGN PATENT DOCUMENTS

WO    WO-2008107425 A1 *   9/2008    ........... H04W 52/24

* cited by examiner

*Primary Examiner* — Deepa Belur

(57) ABSTRACT

Systems and methods provide for determining whether a user device is experiencing interference; attempting to identify a source of the interference based on determining that the user device is experiencing interference; initiating a timer in response to determining that the user device is experiencing interference; determining whether the source of the interference was identified before the timer expires; and dynamically mitigating the interference based on identifying the source of the interference before the timer expires.

20 Claims, 5 Drawing Sheets

METHODS AND SYSTEMS FOR DYNAMIC INTERFERENCE MITIGATION

BACKGROUND

The ongoing development and design of future generation wireless networks involves the use of multiple available radio frequency (RF) bands, implements alternative radio access technologies (RATs), and defines core network functions that provide a distinct experience relative to current or legacy wireless networks (e.g., Fourth Generation (4G) networks). However, the transition from legacy systems to next generation networks presents a challenge for network service providers. Concurrently supporting users of older technologies (e.g., 4G) and users of the new systems (e.g., Fifth Generation (5G)) within the limits of the available wireless spectrum may cause unwanted radio link interference.

DETAILED DESCRIPTION

Figure 1:
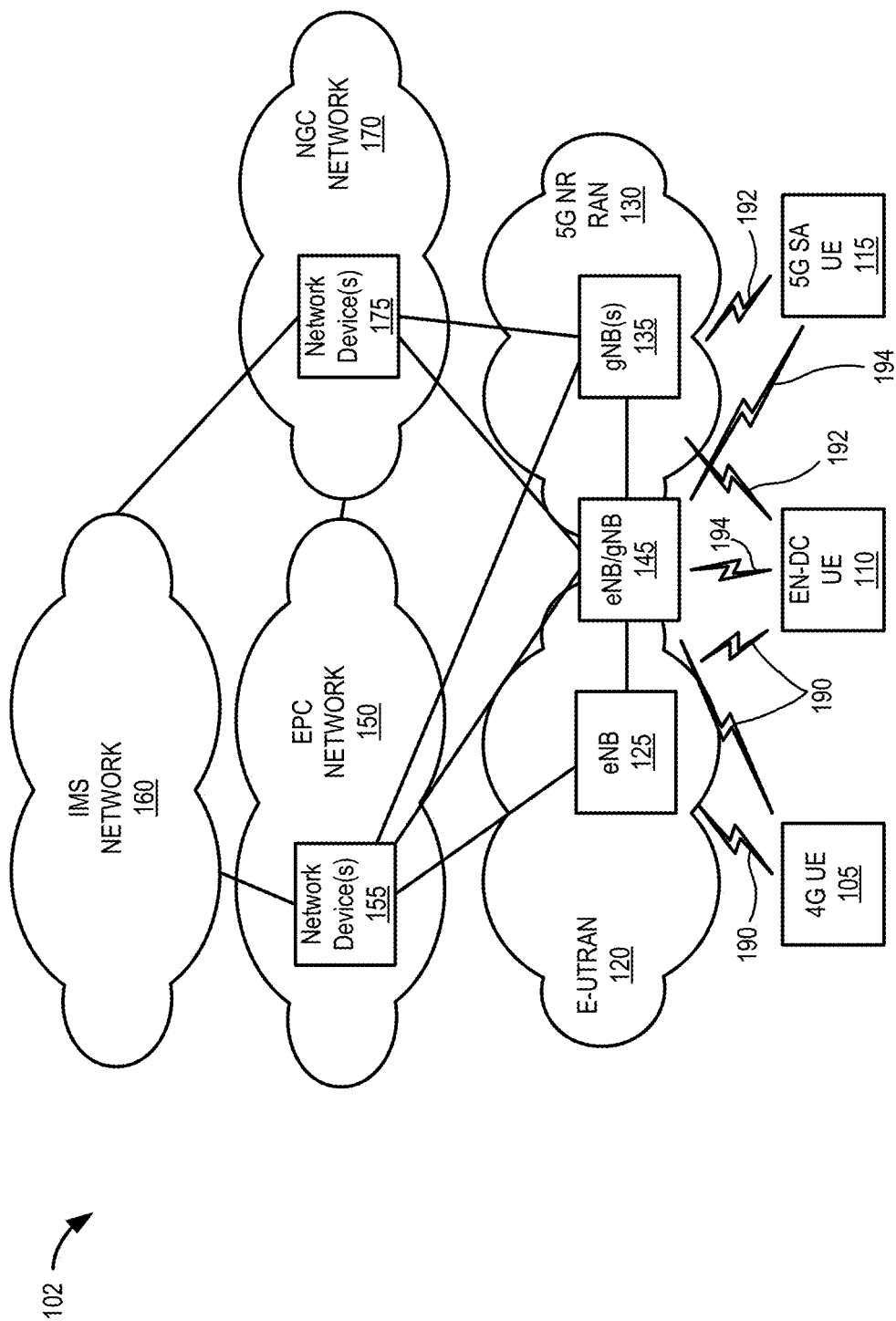
FIG. 1 is a diagram illustrating an exemplary spectrum sharing radio environment in which systems and methods described herein may be implemented.

The following detailed description refers to the accompanying drawings. The same reference numbers in different drawings may identify the same or similar elements. Also, the following detailed description does not limit the invention.

While new wireless networks, such as 3GPP Fifth Generation-New Radio (5G NR) networks and beyond, present opportunities for greater speeds, lower latency, and more connected devices than wireless networks based on earlier standards (e.g., 4G Long Term Evolution (4G-LTE)), 5G NR technology is not directly compatible with networks based on 4G LTE standards. Rather, 5G NR networks require radio access technology (RAT) and core network functions that are distinct from those currently used for 4G LTE networks. Nevertheless, 5G-capable end devices may continue to rely on 4G LTE carriers or 5G carriers that share the same spectrum with 4G LTE carriers for wireless access due to the limited coverage areas of 5G NR cells, particularly during the build-out of the 5G infrastructure. As used herein, "carrier" may refer to a particular frequency band or a discrete portion of a particular frequency band.

The ever-increasing demand for 5G NR services may be addressed through network densification with respect to existing infrastructures, which has led to an increase of radio link interference on both uplink (UL) and downlink (DL) radio interfaces. Traditional air interface optimization mitigation techniques may reduce signal interference somewhat, but such techniques have practical limits in their effectiveness for 5G serving cells that are subject to intra-frequency transmissions from neighboring 4G cells. A "serving cell" as used herein may be associated with a serving base station to which a user equipment (UE) is currently attached, while a "neighboring cell" may be associated with one or more neighboring base stations or one or more neighboring sectors of the serving cell of the serving base station that are within physical proximity or adjacent to the serving cell and/or to the UE. In this regard, signals from the neighboring cells may be "visible" to the UE and may potentially cause interference in its operation.

In particular, the LTE cell-specific reference signal (CRS) is an always-on signal transmitted by serving and neighboring 4G LTE base stations that may cause interference. In 5G NR Dynamic Spectrum Sharing (DSS), 4G LTE carriers and 5G NR carriers may dynamically allocate resources from a base station within a same RF frequency but in different time and/or frequency domains (e.g., slots and/or physical resource blocks). In 5G NR DSS deployment, LTE CRS interference to NR may be an issue. With the LTE CRS interference, significant spectral efficiency loss may be seen.

NR uses a different reference signal design than LTE. While LTE deployment primarily relies on CRS, NR uses synchronization signals (SS)/physical broadcast channel (PBCH) block (SSB) demodulation reference signals (DMRS), tracking reference signals (TRS), channel state information (CSI)-Reference Signals (RS)/CSI-interference measurements (IM), and a physical downlink shared channel (PDSCH)/physical downlink control channel (PDCCH) DMRS. Some interference issues have been identified in global deployment, especially in the time division duplex (TDD) mid-band spectrum.

Some 5G NR coverage may rely on a spectrum currently designated for 4G LTE connections (e.g., a shared spectrum), while other 5G NR coverage may use a much higher frequency spectrum (e.g., gigahertz (GHz) frequencies such as centimeter wave or millimeter wave, referred to herein as mmWave NR, or simply mmWave). The shared spectrum designated for 4G LTE may be statically or dynamically shared with 5G NR. In contrast with cell sizes for lower frequency bands (e.g., megahertz (MHz) frequencies, which may cover several miles), cell sizes for mmWave NR are typically smaller. Thus, use of lower frequency bands may be used to provide continuous 5G NR coverage (e.g., using a combination of lower frequency band cells and mmWave cells). Limited availability of wireless spectrum precludes simply assigning a dedicated 5G spectrum to lower frequency bands. Instead, a lower frequency 5G spectrum may gradually replace the 4G spectrum over time as the use of 5G-capable end devices surpasses the use of 4G-capable end devices. The lower frequency bands may be susceptible to intra-frequency interference due to their propagation properties.

Dual connectivity (DC) solutions are employed when end devices (e.g., user devices) can connect to different radio access technology (RAT) types concurrently or to different frequencies in the same RAT. For example, a user device may connect concurrently to a 5G NR radio access network (RAN) and an Evolved Universal Mobile Telecommunications System (UMTS) Terrestrial Radio Access Network (E-UTRAN) of a 4G-LTE network. In such cases, downlink and uplink packets can be transmitted over one or both of the RATs. Thus, an EN-DC UE may connect concurrently to 5G NR and E-UTRAN for different bearers (e.g., different logical channels with particular end-to-end quality of service (QoS) requirements) or even split bearers.

FIG. 1 is a diagram illustrating an exemplary multi-RAT dual connectivity network environment in which systems and methods described herein may be implemented. In particular, FIG. 1 is a diagram of an exemplary network environment 102 for introducing dynamic spectrum sharing (DSS) for 4G LTE and 5G NR connections. As shown in FIG. 1, network environment 102 may include 4G-capable UE 105, Evolved Universal Mobile Telecommunications System (UMTS) Terrestrial Radio Access (E-UTRA)-5G New Radio (NR) Dual Connectivity (EN-DC)-capable UE 110, a 5G standalone (SA) UE 115, an E-UTRA network 120 including one or more evolved Node B (eNB) 125, a 5G NR RAN 130 including one or more next generation Node B (gNB) 135, one or more combined eNB/gNBs 145, an evolved packet core (EPC) network 150 with network devices 155, an Internet Protocol (IP) multimedia subsystem (IMS) network 160, and a next generation core (NGC) network 170 with network devices 175. 4G UE 105, EN-DC UE 110, and 5G SA UE 115 may be collectively referred to herein as "end devices 105/110/115" or generically as "end device 105/110/115." Similarly, eNB 125, gNB 135, and eNB/gNB 145 may be collectively referred to herein as "wireless stations 125/135/145" or generically as "wireless station 125/135/145." According to other embodiments, environment 102 may include additional networks, fewer networks, and/or different types of networks than those illustrated and described herein.

Environment 102 includes links between the networks and between the devices. Environment 102 may be implemented to include wired, optical, and/or wireless links among the devices and the networks illustrated. A communication connection via a link may be direct or indirect. For example, an indirect communication connection may involve an intermediary device and/or an intermediary network not illustrated in FIG. 1. Additionally, the number and the arrangement of links illustrated in environment 102 are exemplary.

In the configuration of FIG. 1, 4G UE 105 may use a wireless channel 190 to access E-UTRAN 120. Wireless channel 190 may correspond, for example, to physical layer protocols in accordance with 4G radio access technology. More particularly, for example, a wireless channel 190 may correspond to physical layer protocols for 4G RAN standards. EN-DC UE 110 may use wireless channels 190, 192, and 194 to access E-UTRAN 120 and/or 5G NR RAN 130. 5G SA UE 115 may use wireless channels 192 and 194 to access 5G NR RAN 130. According to implementations described herein, 4G UE 105, EN-DC UE 110, and/or 5G SA UE 115 may support carrier aggregation of more than one carrier frequency band for uplink and/or downlink transmissions.

Wireless channels 192 may correspond, for example, to physical layer protocols in accordance with 5G RAT. More particularly, for example, wireless channel 192 may correspond to physical layer protocols for 5G NR standards. Wireless channels 190/192 may be used to provide communications to/from EN-DC UE 110 using dual-connectivity with different bearers and/or split bearers. Similar to wireless channels 192, wireless channels 194 may correspond to physical layer protocols in accordance with 5G radio access technology. However, in contrast with the radio frequencies of wireless channels 192, wireless channel 194 may use lower frequency bands (e.g., shared with 4G). Wireless channels 192/194 may be used to provide communications to/from 5G SA UE 115 using dual connectivity with different bearers and/or split bearers.

4G UE 105 may include a computational device that is capable of communicating with E-UTRAN 120. 4G UE 105 may enable a user to access EPC network 150 and/or interact with devices in IMS network 160 or another type of application layer network. 4G UE 105 may include, for example, a personal communications system (PCS) terminal (e.g., a smartphone that may combine a cellular radiotelephone with data processing and data communications capabilities), a tablet computer, a personal computer, a laptop computer, a gaming console, an Internet television, or other types of computation or communication devices.

EN-DC UE 110 may include a computational device having multiple coverage mode capabilities, and thus the capability to communicate simultaneously with different wireless stations (e.g., eNB 125, gNB 135, eNB/gNB 145, etc.) using different wireless channels (e.g., channels 190/192/194) corresponding to the different RANs (e.g., E-UTRAN 120 and 5G NR RAN 130). Thus, EN-DC UE 110 may be referred to herein as an EN-DC-capable end device when distinguishing from an end device that is not EN-DC-capable, such as 4G UE 105. EN-DC UE 110 may include, for example, a cellular radiotelephone, a smart phone, a tablet, any type of internet protocol (IP) communications device, a Voice over Internet Protocol (VoIP) device, a laptop computer, a wearable computer, a gaming device, a media player device, or a digital camera that includes communication capabilities (e.g., wireless communication mechanisms such as Wi-Fi). In other implementation, EN-DC UE 110 may be implemented as a machine-type communications (MTC) device, an Internet of Things (IoT) device, a machine-to-machine (M2M) device, etc.

Similar to EN-DC UE 110, 5G SA UE 115 may include a computational or communication device having multiple coverage mode capabilities, and thus the capability to communicate simultaneously with different wireless stations (e.g., gNB 135, eNB/gNBs 145, etc.) using different wireless channels (e.g., channels 192/194) corresponding to 5G NR RAN. Similar to EN-DC UE 110, 5G SA UE 115 may be configured to use, among other channels, wireless channel 194 with lower frequency bands for 5G.

eNB 125 may include a network device that has computational and wireless communication capabilities. In some instances, eNB 125 may be referred to as a "wireless station." eNB 125 may include a transceiver system and other components that allow 4G UE 105 to wirelessly connect to E-UTRAN 120 and EPC network 150. eNB 125 may interface with EPC network 150 via an S1 interface, for example.

gNB 135 may include a network device and other components that allow EN-DC UE 110 to wirelessly connect to 5G NR RAN 130 and EPC network 150. According to one implementation, gNB 135 may use dedicated radio frequencies (e.g., wireless channels 192) that are distinct from lower frequency bands used for 4G (e.g., wireless channels 190). In one implementation, gNB 135 may interface with EPC network 150 via an S1 interface. gNB 135 may include a network device and other components that allow 5G SA UE 115 to connect to 5G NR RAN 130, using 5G frequency bands. Combined eNB/gNB 145 may include a network device and other components that allow 5G SA UE 115 to wirelessly connect to 5G NR RAN 130 and NGC network 170. According to one implementation, eNB/gNBs 145 may use portions of the lower frequency bands (e.g., wireless channels 194 for 5G communications) that are part of (but distinct from) the lower frequency bands allocated for 4G communications (e.g., wireless channels 190). For example, in one implementation, eNB/gNBs 145 may be configured to dynamically allocate portions of allocated spectrum for 4G and 5G connections. As used herein, "NR shared spectrum" may refer to lower frequency bands (in comparison to mmWave frequencies) allocated for 5G, and "4G shared spectrum" may refer to lower frequency bands allocated for 4G. In one implementation, eNB/gNBs 145 may interface with EPC network 150 via an S1 interface and interface with NGC network 170 via an NG interface.

Combined eNB/gNB 145 may include a network device and other components that allow EN-DC UE 110 to wirelessly connect to 5G NR RAN 130 and NGC network 170. According to one implementation, eNB/gNBs 145 may use static portions of some lower frequency bands that are part of (but distinct from) the lower frequency bands allocated for 4G communications (e.g., wireless channels 190). Additionally, eNB/gNB 145 may be configured to dynamically allocate shared spectrum between 4G and 5G channels (e.g., channels 194) for other frequency bands. For example, in one implementation, eNB/gNBs 145 may be configured to statically allocate Band 5 frequencies and dynamically allocate Bands 2 and 66 for different 4G and 5G connections.

EPC network 150 may include one or multiple networks of one or multiple types. According to an exemplary implementation, EPC network 150 may include a complementary network pertaining to multiple RANs. For example, EPC network 150 may include the core part of an LTE network, an LTE-Advanced (LTE-A) network, an LTE-A Pro network, a legacy network, and so forth. Depending on the implementation, EPC network 150 may include various network elements that may be implemented in network devices 155. Such network elements may include a mobility management entity (MME), a packet data network gateway (PGW), a serving gateway (SGW), a policy charging rules function (PCRF), a home subscriber server (HSS), as well other network elements pertaining to various network-related functions, such as billing, security, authentication and authorization, network polices, subscriber profiles, and/or other network elements that facilitate the operation of EPC network 150.

IMS network 160 may include a network for delivering IP multimedia services and may provide media flows between end devices 105/110/115 and external IP networks or other networks (not shown in FIG. 1). IMS network 160 may include devices and/or functions to support voice calls, data calls, and other applications for end devices.

NGC network 170 may include a core network to support standalone 5G operation and functionality. For example, NGC network 170 may include various network devices 175 that support the core part of a next generation network. By way of further example, NGC network 170 may include a user plane function (UPF), an access and mobility management function (AMF), a session management function (SMF), a unified data management (UDM) device, an authentication server function (AUSF), a network slice selection function (NSSF), a network repository function (NRF), a policy control function (PCF), and a charging system (CS). According to other exemplary embodiments, the next generation core network may include additional, different, and/or fewer network devices than those described.

FIG. 1 provides an overview of network arrangements to implement 5G networks while also supporting 4G connections. Radio resource control (RRC) may be considered a protocol for handling signaling between an end device 105/110/115 and a radio access network (e.g., E-UTRAN 120 and/or 5G NR RAN 130). RRC states (e.g., "idle mode," "connected mode") may be handled, for example, at a control plane which includes an RRC layer. A "cell" as used herein may include a coverage area served by a wireless station (e.g., one of eNBs 125, gNB 135, or eNB/gNB 145) using a particular frequency band. Thus, in some cases, a cell and the wireless station servicing the cell may be referred to interchangeably. In some implementations, end devices 105/110/115 may be separate devices, or alternatively, may include logical functionalities, e.g., one physical end device may operate as a 4G UE, or EN-DC UE, or 5G SA UE, or other type of UE, based on a current location relative to network coverage and/or network configuration.

Figure 2:
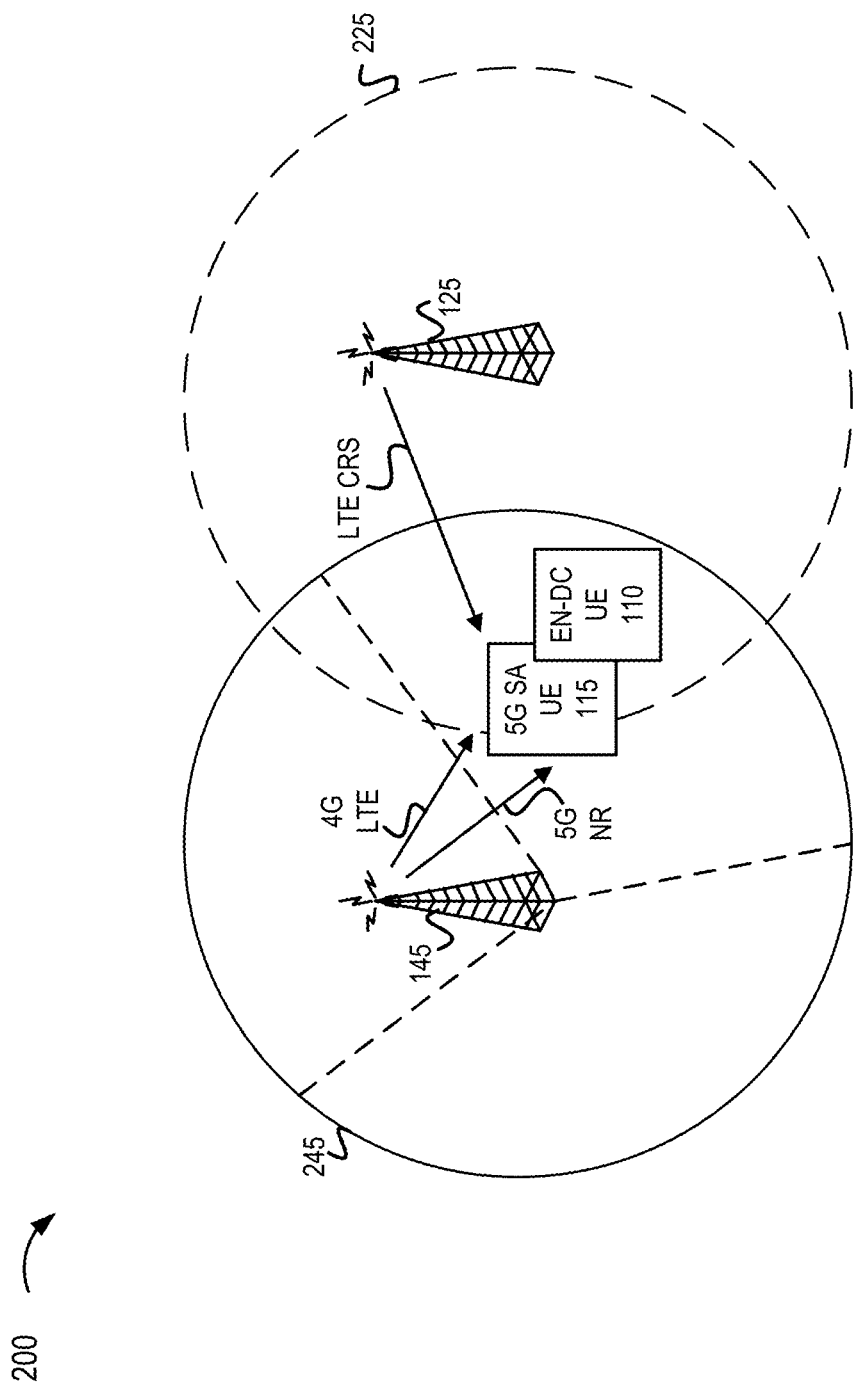
FIG. 2 is a diagram illustrating an exemplary serving cell and neighboring cell(s) in a portion of the network environment of FIG. 1.

FIG. 2 is a diagram of a radio environment 200 in which 5G SA UE 115 and/or EN-DC UE 110 may operate. As shown, 5G SA UE 115 may be connected to a serving cell 245 associated with serving eNB/gNB 145 via wireless channel 194 at a location that is also proximate to a neighboring cell 225 associated with eNB 125 or a non-serving eNB/gNB 145. In one embodiment, serving cell 245 may provide dynamic spectrum sharing (DSS) in which 4G LTE carriers and 5G NR carriers are dynamically allocated resources from eNB/gNB 145 within a same RF frequency but in different time and/or frequency domains, e.g., slots and/or physical resource blocks, and by configuring CRS rate matching on the NR carrier.

As shown in FIG. 2, 5G SA UE 115 may be located near/within a coverage area of cell 225 associated with one or more neighboring eNBs 125 and/or non-serving eNB/gNBs 145. In this case, the air interface encountered by 5G SA UE 115 may include radio signals from eNB 125 and/or non-serving eNB/gNBs 145 that may be in the same frequency as the 5G NR carrier via which 5G SA UE 115 is attached to serving eNB/gNB 145. For example, eNB 125 and/or non-serving eNB/gNBs 145 may transmit an always-on LTE CRS that causes intra-frequency interference at 5G SA UE 115.

As indicated above, FIG. 2 is provided as an example. Other examples are possible and can differ from what was described with regard to FIG. 2. For example, multiple neighboring cells 225 may have overlapping coverage areas in which EN-DC UE 110 may move in and out of while maintaining a connection to eNB/gNB 145. Referring to FIG. 2, exemplary connections are shown when UE 115 is in a coverage area 245 (e.g., serviced by eNB/gNB 145) with NR shared spectrum for 5G. According to various implementations, eNB/gNB 145 may include one or multiple sectors associated with one or more antenna arrays and beamforming techniques (represented by the three dashed lines dividing serving cell 245 into three sectors). In some implementations, the intra-frequency interference at 5G SA UE 115 (or other UE type) may be associated with LTE CRS transmissions from a neighboring sector.

Figure 3:
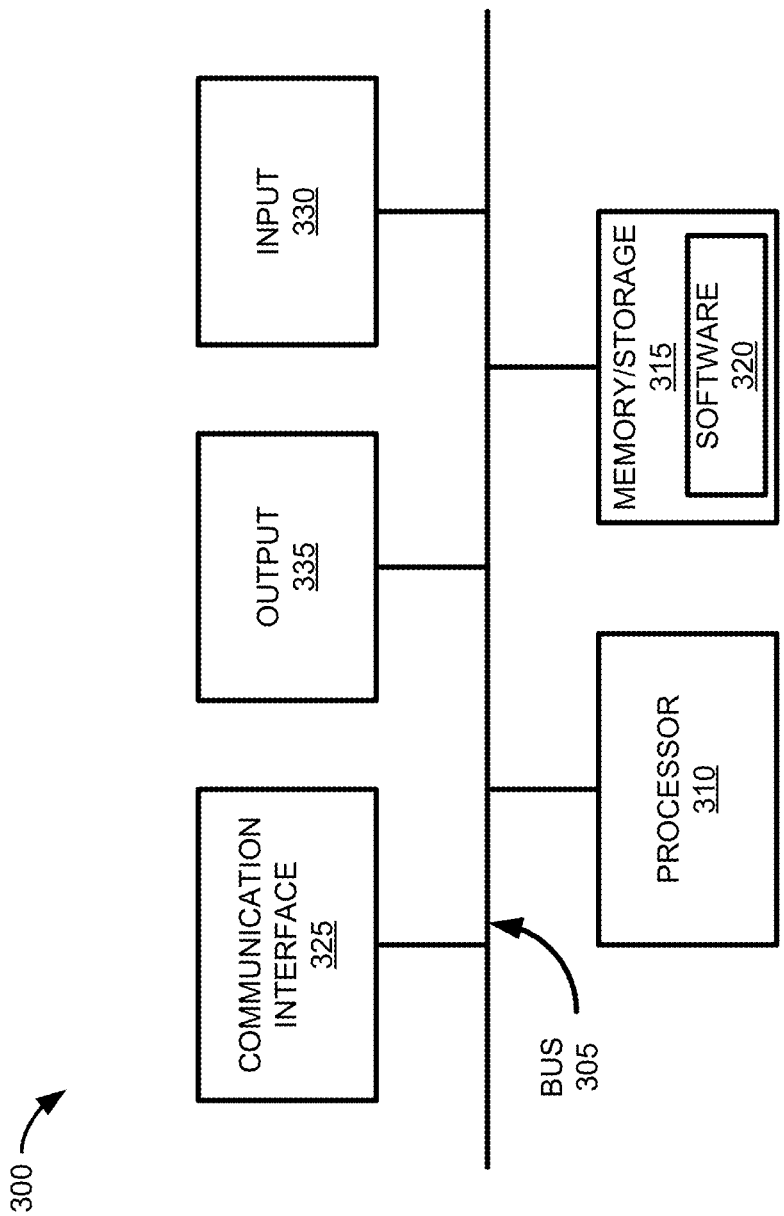
FIG. 3 is a diagram illustrating exemplary components of a device that may correspond to one or more of the devices illustrated and described herein.

FIG. 3 is a diagram illustrating exemplary components of a device 300 that may correspond to one or more of the devices described herein. For example, device 300 may correspond to components included in end devices 105/110/115, wireless stations 125/135/145, network devices 155, network devices 175, or other devices in environment 102. As illustrated in FIG. 3, according to an exemplary embodiment, device 300 includes a bus 305, a processor 310, a memory/storage 315 that stores software 320, a communication interface 325, an input 330, and an output 335. According to other embodiments, device 300 may include fewer components, additional components, different components, and/or a different arrangement of components than those illustrated in FIG. 3 and described herein.

Bus 305 includes a path that permits communication among the components of device 300. For example, bus 305 may include a system bus, an address bus, a data bus, and/or a control bus. Bus 305 may also include bus drivers, bus arbiters, bus interfaces, and/or clocks.

Processor 310 includes one or multiple processors, microprocessors, data processors, co-processors, application specific integrated circuits (ASICs), controllers, programmable logic devices, chipsets, field-programmable gate arrays (FPGAs), application specific instruction-set processors (ASIPs), system-on-chips (SoCs), central processing units (CPUs) (e.g., one or multiple cores), microcontrollers, and/or some other type of component that interprets and/or executes instructions and/or data. Processor 310 may be implemented as hardware (e.g., a microprocessor, etc.), a combination of hardware and software (e.g., a SoC, an ASIC, etc.), may include one or multiple memories (e.g., cache, etc.), etc. Processor 310 may be a dedicated component or a non-dedicated component (e.g., a shared resource).

Processor 310 may control the overall operation or a portion of operation(s) performed by device 300. Processor 310 may perform one or multiple operations based on an operating system and/or various applications or computer programs (e.g., software 320). Processor 310 may access instructions from memory/storage 315, from other components of device 300, and/or from a source external to device 300 (e.g., a network, another device, etc.). Processor 310 may perform an operation and/or a process based on various techniques including, for example, multithreading, parallel processing, pipelining, interleaving, etc.

Memory/storage 315 includes one or multiple memories and/or one or multiple other types of storage mediums. For example, memory/storage 315 may include one or multiple types of memories, such as, random access memory (RAM), dynamic random access memory (DRAM), cache, read only memory (ROM), a programmable read only memory (PROM), a static random access memory (SRAM), a single in-line memory module (SIMM), a dual in-line memory module (DIMM), a flash memory (e.g., a NAND flash, a NOR flash, etc.), and/or some other type of memory. Memory/storage 315 may include a hard disk (e.g., a magnetic disk, an optical disk, a magneto-optic disk, a solid state disk, etc.), a Micro-Electromechanical System (MEMS)-based storage medium, and/or a nanotechnology-based storage medium. Memory/storage 315 may include a drive for reading from and writing to the storage medium.

Memory/storage 315 may be external to and/or removable from device 300, such as, for example, a Universal Serial Bus (USB) memory stick, a dongle, a hard disk, mass storage, off-line storage, network attached storage (NAS), or some other type of storing medium (e.g., a compact disk (CD), a digital versatile disk (DVD), a Blu-Ray disk (BD), etc.). Memory/storage 315 may store data, software, and/or instructions related to the operation of device 300.

Software 320 includes an application or a program that provides a function and/or a process. Software 320 may include an operating system. Software 320 is also intended to include firmware, middleware, microcode, hardware description language (HDL), and/or other forms of instruction. Additionally, for example, device 300 may include logic to perform tasks, as described herein, based on software 320.

Communication interface 325 permits device 300 to communicate with other devices, networks, systems, devices, and/or the like. Communication interface 325 includes one or multiple wireless interfaces and/or wired interfaces. For example, communication interface 325 may include one or multiple transmitters and receivers, or transceivers. Communication interface 325 may include one or more antennas. For example, communication interface 325 may include an array of antennas. Communication interface 325 may operate according to a protocol stack and a communication standard. Communication interface 325 may include various processing logic or circuitry (e.g., multiplexing/de-multiplexing, filtering, amplifying, converting, error correction, etc.).

Input 330 permits an input into device 300. For example, input 330 may include a keyboard, a mouse, a display, a button, a switch, an input port, speech recognition logic, a biometric mechanism, a microphone, a visual and/or audio capturing device (e.g., a camera, etc.), and/or some other type of visual, auditory, tactile, etc., input component. Output 335 permits an output from device 300. For example, output 335 may include a speaker, a display, a light, an output port, and/or some other type of visual, auditory, tactile, etc., output component. According to some embodiments, input 330 and/or output 335 may be a device that is attachable to and removable from device 300.

Device 300 may perform a process and/or a function, as described herein, in response to processor 310 executing software 320 stored by memory/storage 315. By way of example, instructions may be read into memory/storage 315 from another memory/storage 315 (not shown) or read from another device (not shown) via communication interface 325. The instructions stored by memory/storage 315 cause processor 310 to perform a process described herein. Alternatively, for example, according to other implementations, device 300 performs a process described herein based on the execution of hardware (processor 310, etc.).

Figure 4:
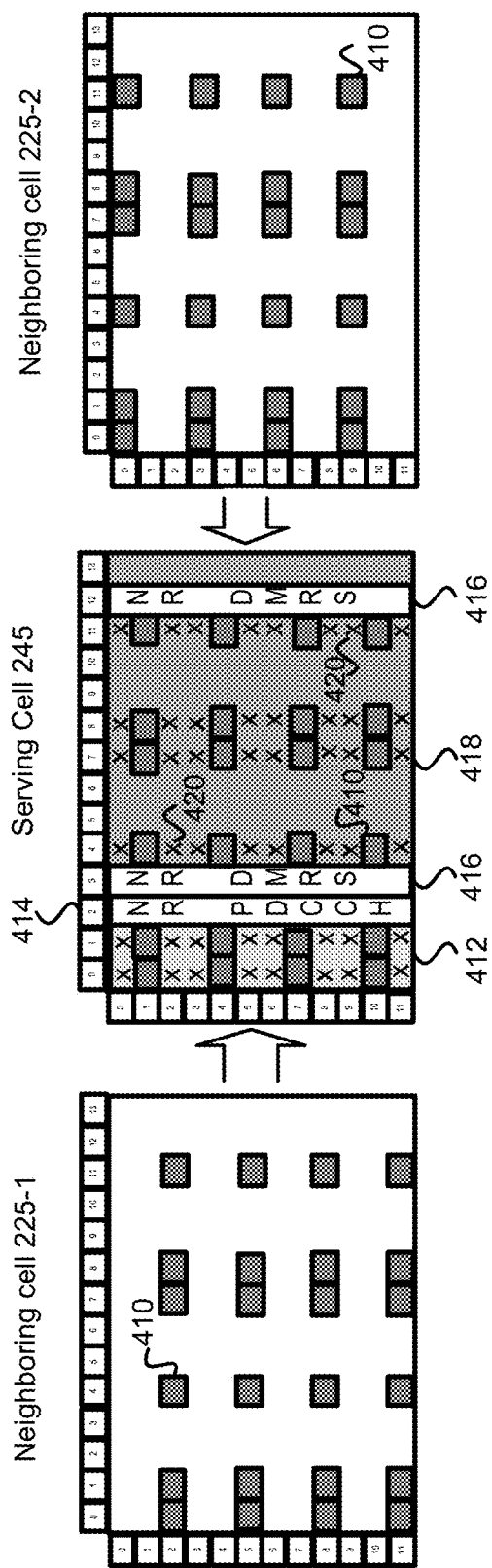
FIG. 4 is a diagram illustrating interference from neighboring cells.

FIG. 4 is a diagram illustrating a serving cell experiencing LTE CRS interference from LTE CRS signals of neighboring cells. FIG. 4 may include serving cell 245 and neighboring cells 225-1 and 225-2 (referred to herein singularly as neighboring cell 225 and in plural as neighboring cells 225). Serving cell 245 and neighboring cells 225-1 and 225-2 may include resource elements that transmit different types of data. Section 412 of serving cell 245 illustrates an LTE physical downlink control channel (PDCCH) portion, section 414 illustrates an NR PDCCH portion, sections 416 illustrate NR physical downlink shared channel (PDSCH) demodulation reference signal (DMRS) portions, and section 418 illustrates an NR physical downlink shared channel (PDSCH) portion. A network (e.g., 5G NR RAN 130, E-UTRAN 120, etc.) may transmit data over resource elements in NR PDSCH 418 portion. A horizontal direction in serving cell 245 and neighboring cells 225 may represent a time resource and a vertical direction may represent a frequency resource. Using these resources, data may be transmitted for the NR.

As shown in FIG. 4, serving cell 245 and neighbor cells 225 may transmit LTE CRS 410 (represented by the shaded squares illustrated in serving cell 245 and neighboring cells 225). The LTE CRS is a reference signal that may be provided to a user device (e.g., end device 105/110) and may provide, for example, channel information, decoding information, and additional information. In the example shown in FIG. 4, the LTE CRS 410 transmitted on neighboring cells 225 are shifted on the frequency spectrum from the LTE CRS 410 transmitted on serving cell 245. For example, as shown in FIG. 4, the LTE CRS 410 illustrated on neighboring cells 225 are shifted in the vertical direction from the LTE CRS 410 illustrated on serving cell 245.

The arrows shown in FIG. 4 illustrate interference from the LTE CRS 410 of neighboring cells 225. As shown in FIG. 4, serving cell 245 may experience interference from the LTE CRS 410 of neighboring cells 225. For example, the LTE CRS 410 at vertical position 2 and horizontal position 4 of neighbor cell 225-1 may interfere with the resource element at vertical position 2 and horizontal position 4 of serving cell 245 to create a resource element that is experiencing interference 420 (illustrated by an X in FIG. 4). As another example, the LTE CRS 410 at vertical position 9 and horizontal position 11 of neighbor cell 225-2 may interfere with the resource element at vertical position 9 and horizontal position 11 of serving cell 245 to create a resource element that is experiencing interference 420 in serving cell 245. In this way, the LTE CRS signals 410 of neighboring cells 225 may interfere with a downlink reception for an end device 105/110/115.

A static method of interference mitigation may result in a waste of resources. For example, if data is not transmitted on resources elements that are experiencing interference 420, the resources at the resources elements that are experiencing interference 420 may be wasted. At a cell center where interference levels are low, if data is not transmitted on the resource elements that are experiencing interference 420, an end device 110/115 may experience a significant throughput reduction as compared to the case where data is transmitted on resource elements 420. Therefore, in order to maximize gain or throughput, a dynamic interference mitigation method may be employed that determines whether interference is being experienced, identifies the source of any interference, and performs interference mitigation based on the source of the interference. By performing dynamic interference mitigation, performance experienced by end device 110/115 may be improved.

Figure 5:
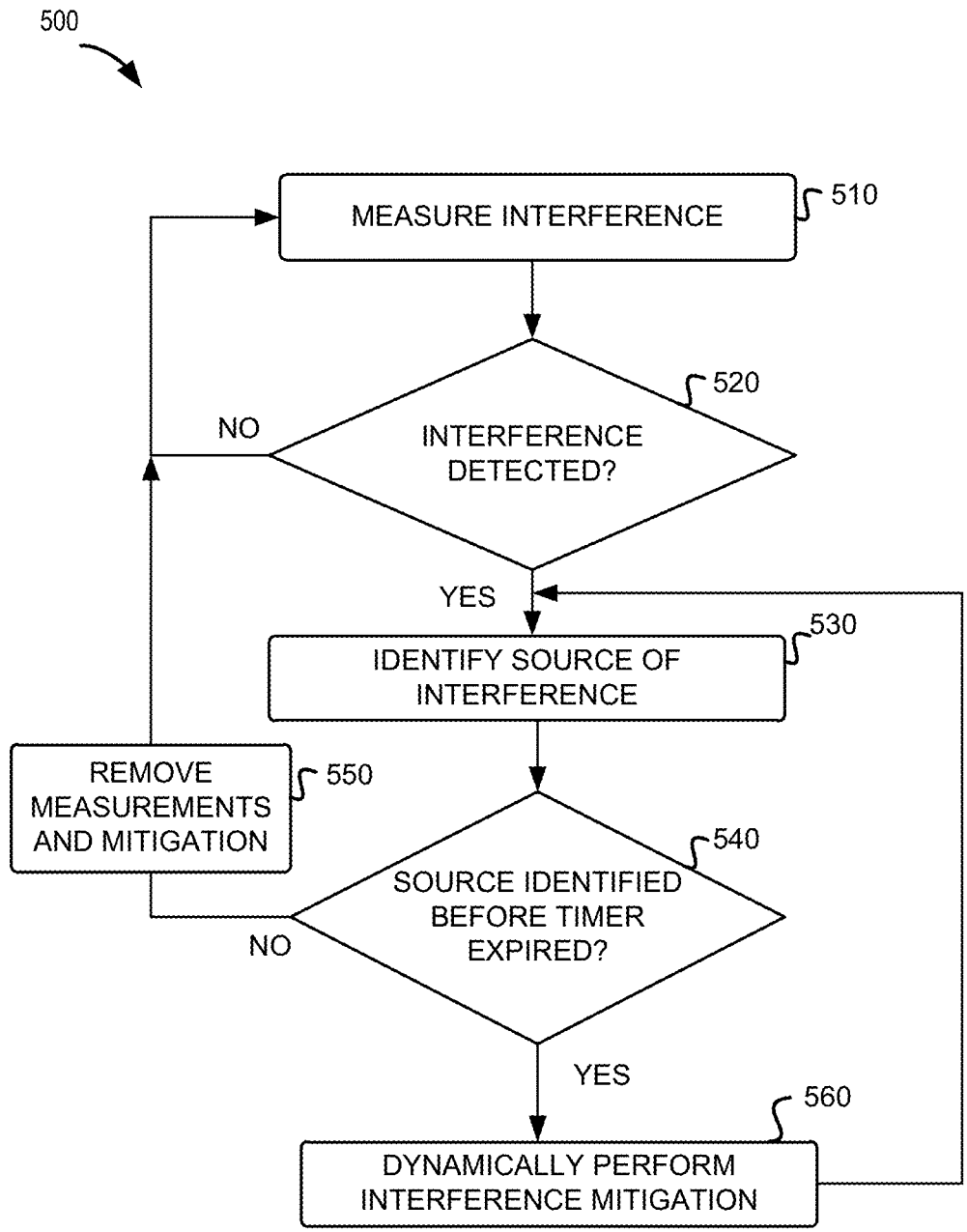
FIG. 5 is a flow diagram illustrating an exemplary process for mitigating interference from a neighboring cell, according to an implementation described herein.

FIG. 5 is a flow diagram illustrating an exemplary process 500 for detecting and mitigating interference, according to an implementation described herein. According to an exemplary embodiment, an end device (e.g., EN-DC UE 110, 5G SA UE 115, etc.) may perform steps of process 500 in conjunction with one or more wireless station 125/135/145 and/or one or more network devices 155/175.

Process 500 may begin by measuring interference (block 510). For example, a measurement may be made to determine whether an end device 105/110/115 is experiencing interference. The interference may be measured using more than one technique.

In one implementation, a signal to interference plus noise ratio (SINR) adjustment threshold may be used to detect the onset of interference. A RAN may perform link adaptation based on a Channel Quality Indicator (CQI) reported by end device 110/115 by matching modulation, coding, and other signal and protocol parameters to conditions on the radio link. The RAN may apply an SINR adjustment based on an observed block error rate (BLER). The BLER is the ratio between the number of transport blocks received in error and the total number of transport blocks transmitted. The BLER may indicate a measure of the quality of a data transmission. When a level of interference is high, typically the BLER will increase and a larger down-adjustment of SINR may be required to meet a target BLER. A measurement may be performed to determine a size of an offset to the link adaptation applied by the network. In one implementation, interference may be detected based on the size of the offset. For example, if the offset is larger than a threshold size, it may be determined that end device 110/115 is experiencing interference.

In another implementation, the interference may be directly measured and reported by end device 110/115. For example, end device 110/115 may be configured (e.g., by eNB/gNB 145 and/or gNB 135 or by another device) with channel state information interference measurement (CSI-IM) resources that allow end device 110/115 to measure and report interference experienced at end device 110/115. The CSI-IM resources may be configured to measure interference on resource elements where interference is expected (e.g., LTE CRS signals from a neighboring cell 225 in DSS deployment, NR tracking reference signals (TRS) and non-zero-power (NZP) CSI reference signals (RS) from neighboring cells 225, etc.). End device 110/115 may perform CSI interference measurements on the resource elements where interference is expected and report the measurements to the network. CSI-IM may be configured, for example, in 20/40/80, etc., millisecond periodicity and may not need to be in all slots even though CSI-IM may incur some overhead. In this implementation, interference may be detected based on the CSI-IM reported by end device 110/115. For example, end device 110/115 may be experiencing interference if the reported CSI-IM is above a threshold number. This method of interference detection may be direct, but may require the network to configure additional resources than detecting interference based on the SINR adjustment threshold.

Process 500 may continue by determining whether interference has been detected (block 520). If interference has not been detected (block 520—NO), measurement to detect interference may continue to be measured (block 510). If interference has been detected (block 520—YES), a source of the interference may be identified and a timer may be initiated (block 530).

In one implementation, the source of the interference may be determined based on a layer 3 measurement. In this implementation, an A1 event may be configured for end device 105/110/115 to report signal strength corresponding to its neighboring cells 225. In the case of DSS, wireless station 125/135/145 may configure an A1 measurement for end device 105/110/115 to provide an environment report for gNB neighbors. All neighbors that have a signal strength within a threshold (e.g., X decibels (dB)) of serving cell 245 may be considered a source of interference. The threshold X may be a configurable parameter determined by wireless station 125/135/145. In one implementation, a neighboring cell 225 may be considered a source of interference if RSRP_serving−RSRP_neighbor≤X dB, where RSRP_serving is the reference signal received power (RSRP) of serving cell 245 and RSRP_neighbor is the RSRP of neighboring cell 225.

Based on the RSRP of neighboring cells 225 and physical cell identifiers (PCI) reported by end device 105/110/115, wireless station 125/135/145 may determine the source of the interference for end device 105/110/115. In the case of LTE CRS mitigation in DSS, wireless station 125/135/145 may additionally map a neighbor NR PCI to the corresponding LTE PCI of the DSS cell. For example, the A1 environment reported by end device 105/110/115 is on the NR, so wireless station 125/135/145 may perform a mapping to determine the LTE interference. The mapping may be locally configured on wireless station 125/135/145. Based on the mapping, the source of LTE interference may be determined.

In another implementation, the source of the interference may be identified using a CSI-IM measurement. For example, a CSI-IM resource may be used to map the resource elements that are expected to be the source of the interference. In this implementation, end device 110/115 may measure interference from multiple neighboring cells 225 and report interference from different interference sources (e.g., CRS interference from different LTE neighboring cells 225 in DSS deployment, TRS and CSI-RS interference from different NR neighboring cells 225, etc.). Based on the CSI reports reported by end device 110/115, wireless station 135/145 may determine which neighboring cell(s) 225 may be the source of interference. In addition, wireless station 135/145 may determine which resource elements in the serving cell 245 suffer from strong interference. CSI-IM measurements may directly provide information about LTE neighboring cells 225 without performing a mapping operation.

Returning to FIG. 5, processing may continue by determining whether the source has been identified before expiration of the timer (block 540). As discussed above, a timer may be initiated when interference is detected. If the source is not identified before the timer has expired (block 540—NO), measurements made to identify the interference source and any interference mitigation that has been activated may be removed (block 550) and processing may return to the beginning of FIG. 5 where interference may continue to be measured (block 510). If the source is identified before the timer has expired (block 540—YES), interference mitigation resources may be dynamically activated or deactivated (block 560). Interference may be mitigated in one of a number of ways.

In a first implementation, dynamic activation or deactivation of interference avoidance/mitigation resources may be based on Layer 2 signaling. In this implementation, wireless station 135/145 may configure multiple semi-persistent or aperiodic zero-power (ZP) resource sets. Each resource set may match one type of neighboring cell CRS interference position (vshift) in the DSS deployment case or one type of neighboring cell NR TRS/CSI-RS interference resource element position. Initially the resource sets may be in a deactivated state and, therefore, wireless station 135/145 may not rate match around the ZP CSI-RS resources. When the source of interference has been identified, wireless station 135/145 may dynamically activate and de-activate one or more of the semi-persistent or aperiodic ZP CSI-RS resource sets based on a location of the interference to rate match around the LTE CRS interference or the NR TRS/CSI-RS interference.

In one implementation, wireless station 135/145 may activate or deactivate the resource sets via Layer 2 signaling to end device 110/115. For example, wireless station 135/145 may activate or deactivate the resource sets via standard-based SP ZP CSI-RS Resource Set Activation/Deactivation Media Access Control (MAC) Control Element (CE). In a second implementation, wireless station 135/145 may use Downlink Control Information (DCI) to activate/deactivate the configured rate matching pattern.

In another implementation, dynamic activation or deactivation of interference avoidance/mitigation resources may be based on Layer 3 signaling. In this implementation, wireless station 125/135/145 may configure/de-configure periodic ZP CSI-RS resource sets as needed via RRC Reconfiguration. Interference mitigation via Layer 3 signaling may result in increased latency and amount of signaling required compared to the Layer 2 solution.

After the interference has been mitigated, processing may continue by monitoring the existing interference. If current interference no longer exists or is not strong enough, all interference mitigation mechanisms may be released. In addition, new interference may be monitored and measured. For example, as end device 110/115 changes location, either within the same serving cell 245 or to a neighboring cell 225, interference may be experienced from a different source. In that case, the source of the interference may be identified and steps may be taken to mitigate the interference.

As set forth in this description and illustrated by the drawings, reference is made to "an exemplary embodiment," "an embodiment," "embodiments," etc., which may include a particular feature, structure or characteristic in connection with an embodiment(s). However, the use of the phrase or term "an embodiment," "embodiments," etc., in various places in the specification does not necessarily refer to all embodiments described, nor does it necessarily refer to the same embodiment, nor are separate or alternative embodiments necessarily mutually exclusive of other embodiment(s). The same applies to the term "implementation," "implementations," etc.

The foregoing description of embodiments provides illustration, but is not intended to be exhaustive or to limit the embodiments to the precise form disclosed. Accordingly, modifications to the embodiments described herein may be possible. For example, various modifications and changes may be made thereto, and additional embodiments may be implemented, without departing from the broader scope of the invention as set forth in the claims that follow. The description and drawings are accordingly to be regarded as illustrative rather than restrictive.

The terms "a," "an," and "the" are intended to be interpreted to include one or more items. Further, the phrase "based on" is intended to be interpreted as "based, at least in part, on," unless explicitly stated otherwise. The term "and/or" is intended to be interpreted to include any and all combinations of one or more of the associated items. The word "exemplary" is used herein to mean "serving as an example." Any embodiment or implementation described as "exemplary" is not necessarily to be construed as preferred or advantageous over other embodiments or implementations.

In addition, while series of blocks have been described with regard to the processes illustrated in FIG. 5 the order of the blocks may be modified according to other embodiments. Further, non-dependent blocks may be performed in parallel. Additionally, other processes described in this description may be modified and/or non-dependent operations may be performed in parallel.

Embodiments described herein may be implemented in many different forms of software executed by hardware. For example, a process or a function may be implemented as "logic," a "component," or an "element." The logic, the component, or the element, may include, for example, hardware (e.g., processor 310, etc.), or a combination of hardware and software (e.g., software 320).

Embodiments have been described without reference to the specific software code because the software code can be designed to implement the embodiments based on the description herein and commercially available software design environments and/or languages. For example, various types of programming languages including, for example, a compiled language, an interpreted language, a declarative language, or a procedural language may be implemented.

Use of ordinal terms such as "first," "second," "third," etc., in the claims to modify a claim element does not by itself connote any priority, precedence, or order of one claim element over another, the temporal order in which acts of a method are performed, the temporal order in which instructions executed by a device are performed, etc., but are used merely as labels to distinguish one claim element having a certain name from another element having a same name (but for use of the ordinal term) to distinguish the claim elements.

Additionally, embodiments described herein may be implemented as a non-transitory computer-readable storage medium that stores data and/or information, such as instructions, program code, a data structure, a program module, an application, a script, or other known or conventional form suitable for use in a computing environment. The program code, instructions, application, etc., is readable and executable by a processor (e.g., processor 310) of a device. A non-transitory storage medium includes one or more of the storage mediums described in relation to memory/storage 315.

To the extent the aforementioned embodiments collect, store or employ personal information provided by individuals, it should be understood that such information shall be collected, stored and used in accordance with all applicable laws concerning protection of personal information. Additionally, the collection, storage and use of such information may be subject to consent of the individual to such activity, for example, through well known "opt-in" or "opt-out" processes as may be appropriate for the situation and type of information. Storage and use of personal information may be in an appropriately secure manner reflective of the type of information, for example, through various encryption and anonymization techniques for particularly sensitive information.

No element, act, or instruction set forth in this description should be construed as critical or essential to the embodiments described herein unless explicitly indicated as such.

All structural and functional equivalents to the elements of the various aspects set forth in this disclosure that are known or later come to be known to those of ordinary skill in the art are expressly incorporated herein by reference and are intended to be encompassed by the claims.

What is claimed is:

1. A method comprising:
   determining whether a user device is experiencing interference;
   initiating a timer in response to determining that the user device is experiencing interference;
   attempting to identify a source of the interference in response to determining that the user device is experiencing interference, wherein the source of the interference comprises at least one of neighboring cells adjacent to a cell that serves the user device;
   determining whether the source of the interference has been identified before the timer has expired; and
   dynamically activating and deactivating mitigation operations for the interference associated with the identified source of the interference in response to identifying the source of the interference before the timer has expired.

2. The method claim 1, wherein determining whether the user device is experiencing interference includes determining whether the user device is experiencing interference based on a signal to interference plus noise ratio (SINR) adjustment threshold.

3. The method claim 1, wherein determining whether the user device is experiencing interference before the timer has expired includes determining whether the user device is experiencing interference based on a channel state information (CSI) interference measurement (IM) before the timer has expired.

4. The method of claim 1, wherein attempting to identify the source of the interference includes attempting to identify the source of the interference based on a reference signal received power (RSRP) measurement of the at least one of the neighboring cells.

5. The method of claim 1, wherein attempting to identify the source of the interference includes attempting to identify the source of the interference based on a channel state information (CSI) interference measurement (IM) of the at least one of the neighboring cells.

6. The method of claim 1, wherein dynamically activating and deactivating mitigation operations for the interference includes:
   configuring multiple semi-persistent or aperiodic zero-power (ZP) channel state information (CSI) reference signal (RS) resource sets, wherein each ZP CSI-RS resource set matches an interference position of the at least one of the neighboring cells; and
   dynamically activating or deactivating one or more CSI-RS resource sets based on the source of the interference to rate match around the interference.

7. The method of claim 1, wherein dynamically activating and deactivating mitigation operations for the interference includes:
   configuring and de-configuring periodic zero-power (ZP) channel state information (CSI) reference signal (RS) resource sets via radio resource control (RRC) reconfigurations.

8. A device comprising:
   one or more processors configured to:
      determine whether a user device is experiencing interference;
      initiate a timer in response to determining that the user device is experiencing interference;
      attempt to identify a source of the interference in response to determining that the user device is experiencing interference, wherein the source of the interference comprises at least one of neighboring cells adjacent to a cell that serves the user device;
      determine whether the source of the interference has been identified before the timer expires; and
      dynamically activate and deactivate mitigation operations for the interference associated with the identified source of the interference in response to identifying the source of the interference before the timer expires.

9. The device of claim 8, wherein, when determining whether the user device is experiencing interference, the one or more processors are further configured to determine that the user device is experiencing interference based on a signal to interference plus noise ratio (SINR) adjustment threshold.

10. The device of claim 8, wherein, when determining whether the user device is experiencing interference before the timer has expired, the one or more processors are further configured to determine whether the user device is experiencing interference based on a channel state information (CSI) interference measurement (IM) before the timer has expired.

11. The device of claim 8, wherein, when attempting to identify the source of the interference, the one or more processors are further configured to attempt to identify the source of the interference based on a reference signal received power (RSRP) measurement of the at least one of the neighboring cells.

12. The device of claim 8, wherein, when attempting to identify the source of the interference, the one or more processors are further configured to attempt to identify the source of the interference based on channel state information (CSI) interference measurement (IM) of the at least one of the neighboring cells.

13. The device of claim 8, wherein, when dynamically activating and deactivating mitigation operations for the interference, the one or more processors are further configured to:
   configure multiple semi-persistent or aperiodic zero-power (ZP) channel state information (CSI) reference signal (RS) resource sets, wherein each ZP CSI-RS resource set matches an interference position of the at least one of the neighboring cells; and dynamically activate or deactivate one or more CSI-RS resource sets based on the source of the interference to rate match around the interference.

14. The device of claim 8, wherein, when dynamically activating and deactivating mitigation operations for the interference associated with the identified source of the interference, the one or more processors are further configured to:
configure and de-configure periodic zero-power (ZP) channel state information (CSI) reference signal (RS) resource sets via radio resource control (RRC) reconfigurations.

15. A non-transitory computer-readable storage medium storing instructions that, when executed by one or more processors, cause the one or more processors to:
determine whether a user device is experiencing interference;
initiate a timer in response to determining that the user device is experiencing interference;
attempt to identify a source of the interference in response to determining that the user device is experiencing interference, wherein the source of the interference comprises at least one of neighboring cells adjacent to a cell that serves the user device;
determine whether the source of the interference has been identified before the timer expires; and
dynamically activating and deactivating mitigation operations for the interference associated with the identified source of the interference in response to identifying the source of the interference before the timer expires.

16. The non-transitory computer-readable storage medium of claim 15, wherein the instructions that cause the one or more processors to determine whether the user device is experiencing interference include instructions that, when executed by the one or more processors, cause the one or more processors to determine that the user device is experiencing interference based on a signal to interference plus noise ratio (SINR) adjustment threshold.

17. The non-transitory computer-readable storage medium of claim 15, wherein the instructions that cause the one or more processors to determine whether the user device is experiencing interference before the timer has expired include instructions that cause the one or more processors to determine whether the user device is experiencing interference based on a channel state information (CSI) interference measurement (IM) before the timer has expired.

18. The non-transitory computer-readable storage medium of claim 15, wherein the instructions that cause the one or more processors to attempt to identify the source of the interference include instructions that cause the one or more processors to attempt to identify the source of the interference based on a reference signal received power (RSRP) measurement of the at least one of the neighboring cells.

19. The non-transitory computer-readable storage medium of claim 15, wherein the instructions that cause the one or more processors to attempt to identify the source of the interference include instructions that cause the one or more processors to attempt to identify the source of the interference based on channel state information (CSI) interference measurement (IM) of the at least one of the neighboring cells.

20. The non-transitory computer-readable storage medium of claim 15, wherein the instructions that cause the one or more processors to dynamically activate and deactivate mitigation operations for the interference include instructions that cause the one or more processors to:
configure multiple semi-persistent or aperiodic zero-power (ZP) channel state information (CSI) reference signal (RS) resource sets, wherein each ZP CSI-RS resource set matches an interference position of the at least one of the neighboring cells; and
dynamically activate or deactivate one or more CSI-RS resource sets based on the source of the interference to rate match around the interference.

\* \* \* \* \*